US011363802B1

(12) United States Patent
Nelson

(10) Patent No.: US 11,363,802 B1
(45) Date of Patent: Jun. 21, 2022

(54) NEST BOX OR BIRDHOUSE

(71) Applicant: Jeffrey Todd Nelson, Star Prairie, WI (US)

(72) Inventor: Jeffrey Todd Nelson, Star Prairie, WI (US)

( * ) Notice: Subject to any disclaimer, the term of this patent is extended or adjusted under 35 U.S.C. 154(b) by 103 days.

(21) Appl. No.: 17/090,213

(22) Filed: Nov. 5, 2020

(51) Int. Cl.
*A01K 31/14* (2006.01)

(52) U.S. Cl.
CPC .................... *A01K 31/14* (2013.01)

(58) Field of Classification Search
CPC .................................................. A01K 31/14
USPC .................. 119/329, 346, 428, 431, 432
See application file for complete search history.

(56) References Cited

U.S. PATENT DOCUMENTS

| 946,323 | A | * | 1/1910 | Boettcher | A01K 31/16 |
| | | | | | 119/329 |
| 1,118,198 | A | * | 11/1914 | Hagie | A01K 31/16 |
| | | | | | 119/329 |
| 3,130,706 | A | * | 4/1964 | Myaida | A01K 31/14 |
| | | | | | 119/428 |
| 3,182,634 | A | * | 5/1965 | Myaida | A01K 31/14 |
| | | | | | 119/428 |
| 3,295,498 | A | * | 1/1967 | Brown | A01K 31/14 |
| | | | | | 119/52.2 |
| 3,367,632 | A | * | 2/1968 | Vail | A01K 31/14 |
| | | | | | 403/324 |
| 5,186,123 | A | * | 2/1993 | Cuddy | A01K 31/14 |
| | | | | | 119/434 |
| 6,029,607 | A | * | 2/2000 | Smigelski | A01K 31/14 |
| | | | | | 119/329 |
| 6,170,437 | B1 | * | 1/2001 | Jones | A01K 31/14 |
| | | | | | 119/431 |
| 6,386,142 | B1 | * | 5/2002 | Holscher | A01K 31/12 |
| | | | | | 119/51.01 |
| 6,397,781 | B1 | * | 6/2002 | Bellington | A01K 31/14 |
| | | | | | 119/431 |
| 10,349,633 | B2 | * | 7/2019 | Kratz | A01K 31/14 |
| 11,272,691 | B1 | * | 3/2022 | Barrett | A01K 39/01 |
| 2007/0095298 | A1 | * | 5/2007 | Whitlock | A01K 31/14 |
| | | | | | 119/431 |

(Continued)

FOREIGN PATENT DOCUMENTS

| CH | 352866 | A | * | 3/1961 | |
| DE | 29821681 | U1 | * | 11/1999 | ............... A01K 1/03 |
| GB | 2135862 | A | * | 9/1984 | ............. A01K 31/06 |

OTHER PUBLICATIONS

English-language translation of CH 352866 (Year: 1961).*

*Primary Examiner* — Lisa L Tsang

(57) ABSTRACT

A nest box or birdhouse wherein a removable roof panel provides easy physical access to a nest cavity and also secures an interchangeable entrance panel in multiple positions—for both active-breeding-season use and off-season storage. All vertical enclosure components can remain in place during activity monitoring, avoiding harm to eggs or hatchlings when the nest box is opened. In the off-season-storage configuration, the enclosed nest cavity is eliminated to prevent infestation. The nest box utilizes a hollow roof-locking pin for increased ventilation. Furthermore, an adjustable-height mounting mechanism helps prevent predator attacks and allows the nest box to be accessed at safe heights during physical monitoring and maintenance.

3 Claims, 17 Drawing Sheets

(56) References Cited

U.S. PATENT DOCUMENTS

| | | | |
|---|---|---|---|
| 2012/0012066 A1* | 1/2012 | Beery | A01K 31/04 119/432 |
| 2014/0123907 A1* | 5/2014 | James | A01K 31/14 119/428 |
| 2019/0017652 A1* | 1/2019 | Hossain | E04H 12/2253 |

* cited by examiner

NEST BOX OR BIRDHOUSE

CROSS-REFERENCE TO RELATED APPLICATIONS

Not Applicable

BACKGROUND OF THE INVENTION

The present invention relates generally to nest boxes (birdhouses) and specifically to nest boxes that allow physical user access for monitoring and maintenance activities. The invention falls under Cooperative Patent Classification A01K 31/14 (2020.08).

Many bird species, like bluebirds, are cavity nesters. However, these species cannot create their own nesting cavities and must rely on other formations—woodpecker holes, rotten wooden fence posts . . . or manufactured nest boxes. With thoughtful design and mounting, a manufactured nest box can offer numerous benefits to natural cavities, including improved predator protection, better shading and ventilation to protect hatchlings, superior cleanliness and drainage to eliminate harmful ectoparasites, more effective problem-species control, and safer monitoring.

Nest box monitoring and maintenance is crucial for the breeding success of desirable species. In fact, unmonitored nest boxes can be counterproductive, facilitating population growth of invasive species. As such, effective monitoring and maintenance must be performed when birds are inhabiting nest boxes as well as when nest boxes are vacant.

Some nest boxes allow access for monitoring and maintenance. However, previous attempts utilize hinged/removable panels that, when repositioned, can be hazardous to eggs, hatchlings, and nest structures. For instance, it is common for eggs or hatchlings to fall out of many nest boxes upon opening, worsened when nest materials adhere to panels being repositioned. Furthermore, if removed, ridged roofs and roofs with attached walls often fail to contain nest materials, especially those of species that reside high in cavities. These deficiencies stand to reason because previous attempts are not intended to allow monitoring and maintenance during habitation.

Many birdhouses form a permanent year-round cavity. These structures are particularly susceptible to infestation and lingering contamination from rodents and other disease-ridden creatures during non-breeding seasons.

Finally, conscientious nest box embodiments should provide adequate ventilation, discourage predator assaults, and allow safe monitoring and maintenance heights. Previous attempts often ignore bird well-being and/or are intended to be mounted in ways that are either easy for predators to attack or difficult for human caretakers to access.

BRIEF SUMMARY OF THE INVENTION

Shortcomings noted above are remedied by the present nest box which features a removable roof panel that lifts off, leaving the full heights of all sidewalls in place. With the roof panel removed, the nesting cavity can be monitored from the top without disturbing or harming contents. In addition, the roof panel secures a removable and interchangeable entrance panel in multiple positions—for both active-breeding-season use and off-season storage. During breeding season, an entrance panel with a species-specific hole size/shape can be placed in the active-use position and removed for easy nesting cavity cleaning between broods. During non-breeding season, the entrance panel can be securely stored in a designated interior location of the nest box to eliminate the nesting cavity and prevent infestation. Function of the present nest box is further enhanced by a hollow ventilation roof-locking pin and an adjustable-height mounting mechanism which helps discourage predator attacks and allows a human caretaker to lower the nesting box for safe monitoring and maintenance activities.

Figure 1:
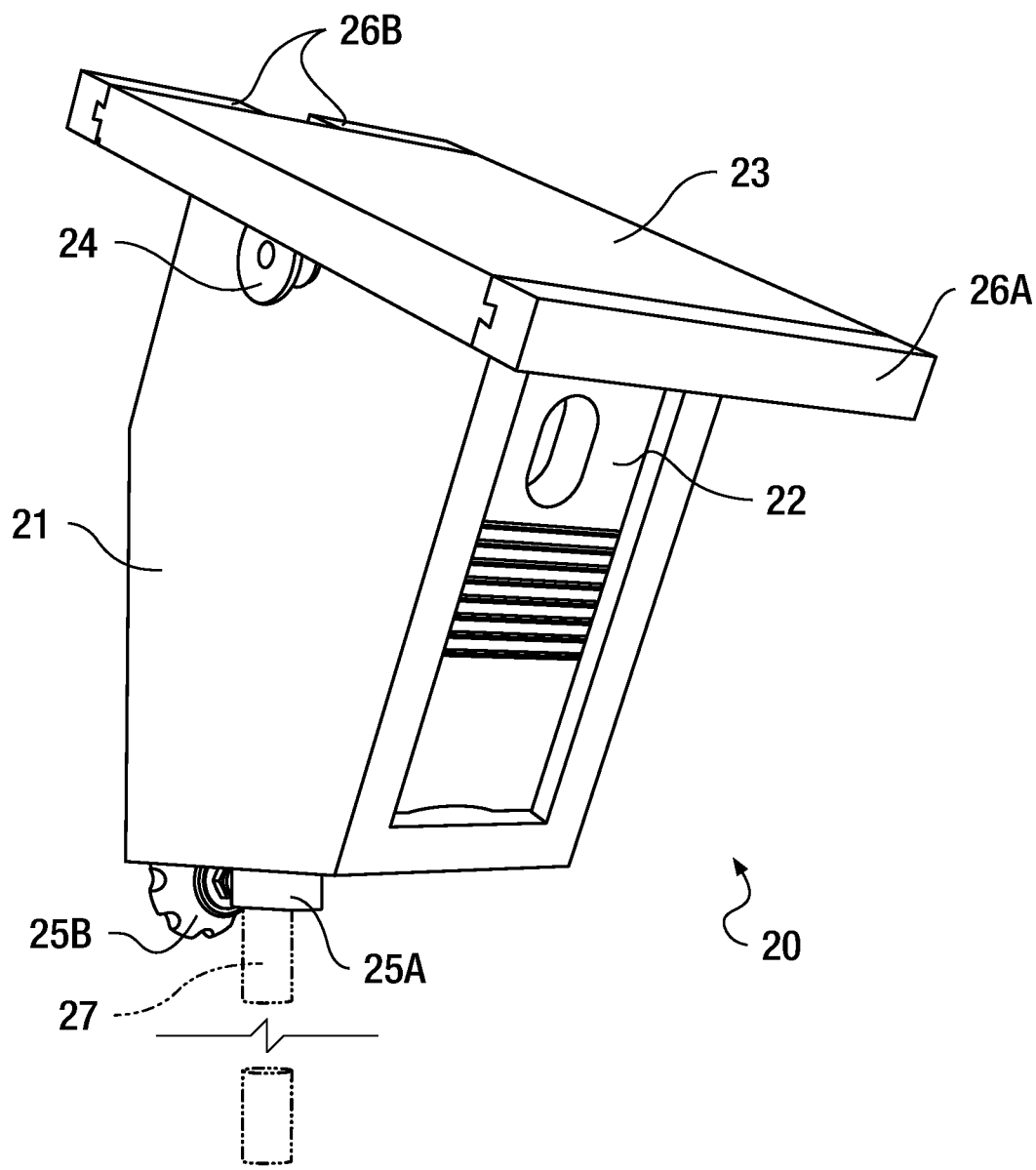
FIG. 1 is a front perspective view of the present nest box mounted on a steel pipe with an entrance panel locked in the active-breeding-season position.

The following REFERENCE CHARACTERS are used:
- 20 present nest box;
- 21 main nest cavity enclosure;
- 22 entrance panel;
- 23 roof panel;
- 24 hollow ventilation locking pin;
- 25A adjustable-height mounting mechanism support component;
- 25B adjustable-height mounting mechanism knob/setscrew component;
- 26A front roof edge trim;
- 26B rear roof edge trim;
- 27 steel pipe;
- 28 pipe cap;
- 29 active-breeding-season channels;
- 30 off-season-storage channels;
- 31 nest cavity floor;
- 32 locking holes;
- 33 protrusion hole;
- 34 entryway;
- 35 outer-ladder grooves;
- 36 inner-ladder grooves;
- 37 ventilation indentation;
- 38 drainage indentation;
- 39 roof protrusion;
- 40 concave ventilation areas;
- 41 ventilation scallops;

42 storage face;
43 roof cutout area;
44 drip-edge groove;
45 truncated face;
46 mounting hole;
47 alignment pin;
48 alignment recess;
P locking-pin path.

DETAILED DESCRIPTION OF THE INVENTION

Referring to FIGS. 1-8, the present nest box is generally designated 20 and comprises five major components: a main nest cavity enclosure 21, an entrance panel 22, a roof panel 23, a hollow ventilation locking pin 24, and an adjustable-height mounting mechanism 25A, 25B. Roof edge trim 26A, 26B may be placed on the roof panel 23 to provide secure footing in areas where birds like to perch. The nest box slides onto readily available steel pipe 27 anchored in the ground. The steel pipe 27 should be of sufficient length to allow nest box positioning at recommended heights for attracting and protecting desired bird species.

Figure 9:
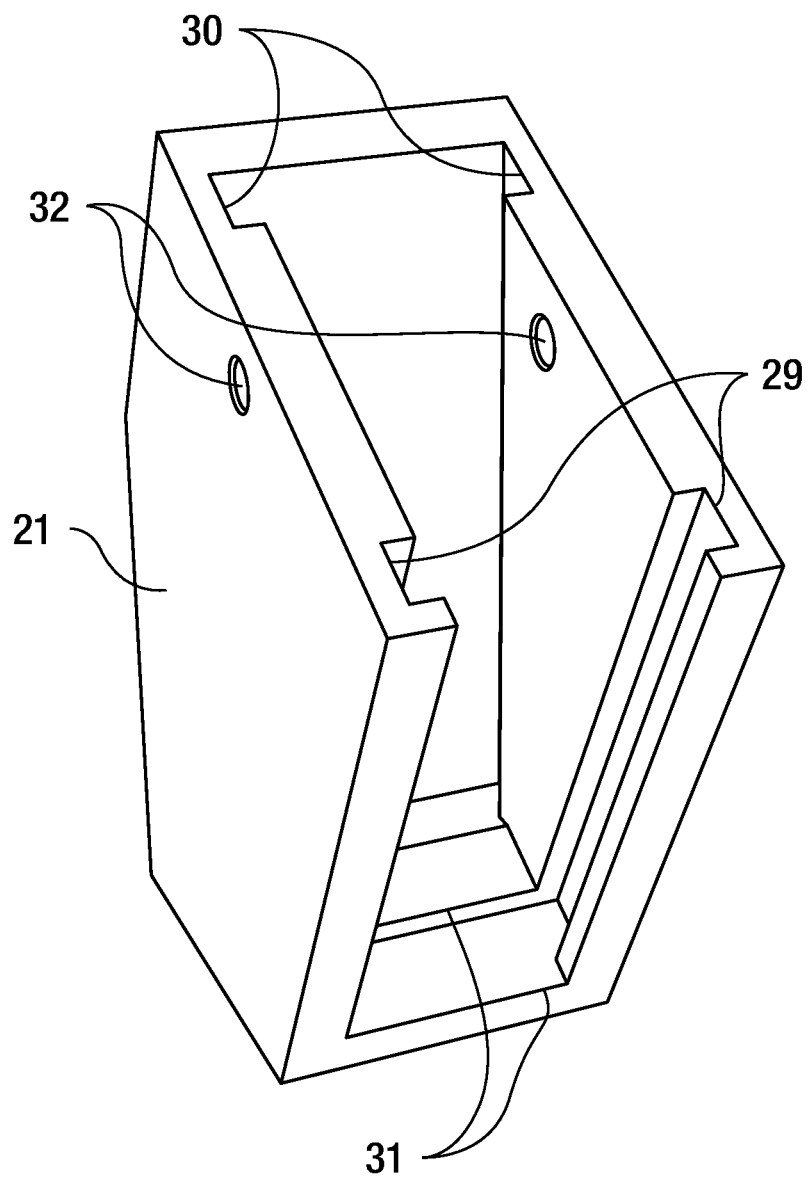
FIG. 9 is a top perspective view of the main nest cavity enclosure.
Figure 10:
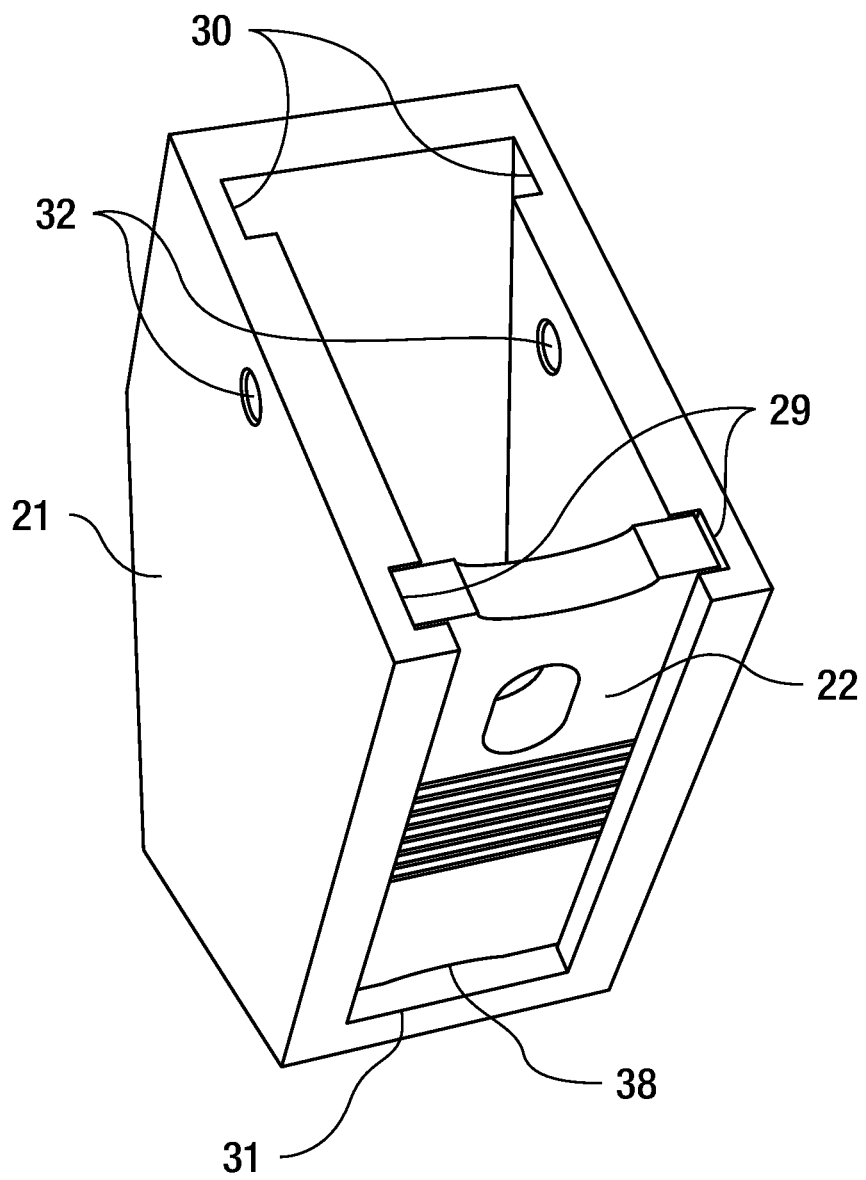
FIG. 10 is a top perspective view of the main nest cavity enclosure with an entrance panel placed in the active-breeding-season position.
Figure 11:
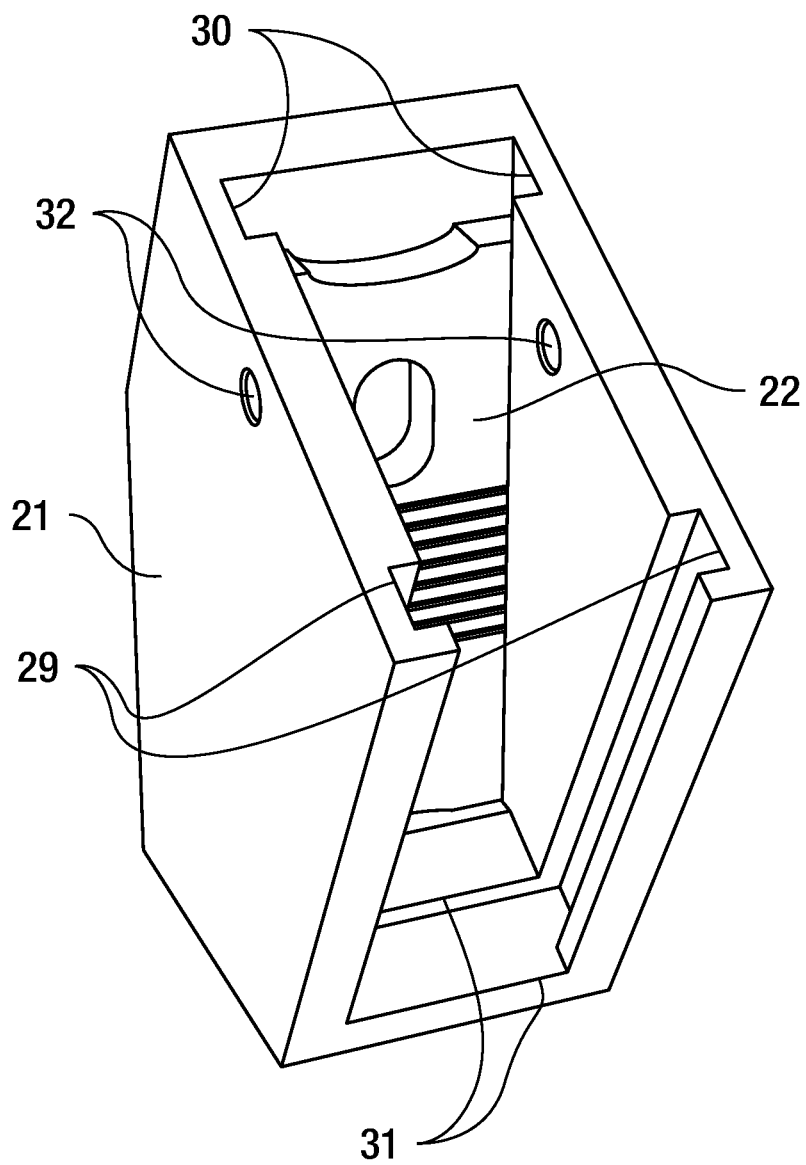
FIG. 11 is a top perspective view of the main nest cavity enclosure with an entrance panel placed in the off-season-storage position.

Referring to FIGS. 9-11, the main nest cavity enclosure 21 can be fashioned in a variety of sizes, volumes, and shapes to suit desired bird species. The main nest cavity enclosure 21 incorporates two pairs of channels 29, 30 to hold an entrance panel 22. Channels 29 are for active-breeding-season use (FIG. 10) and channels 30 are for off-season storage (FIG. 11). When an entrance panel 22 is placed in the off-season-storage position, the enclosed cavity is eliminated to prevent rodent infestation (FIG. 11). The nest cavity floor 31 can be slightly sloped, allowing liquids to drain out through a drainage indentation 38 in the bottom edge of the entrance panel 22 (FIG. 10).

Figure 2:
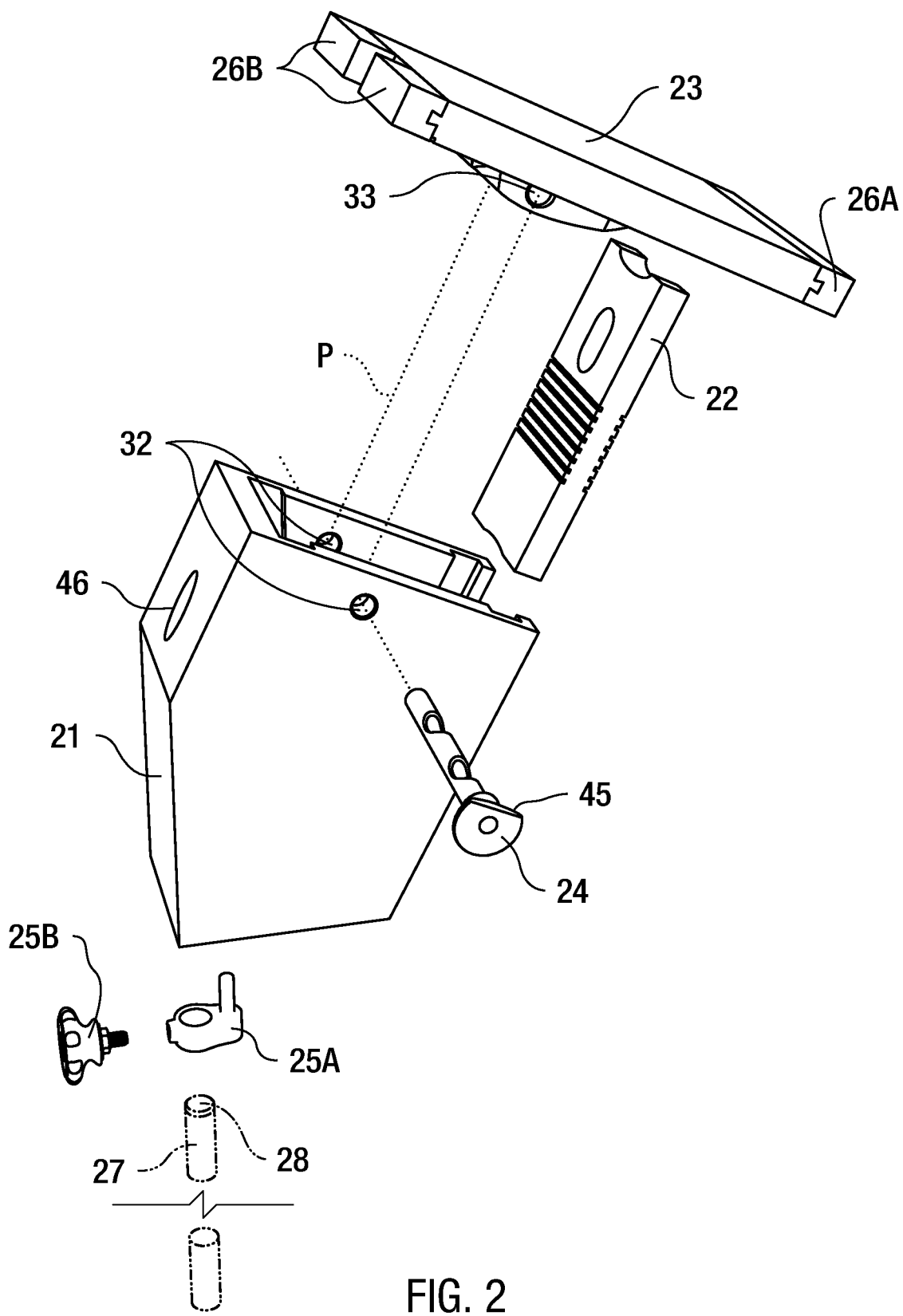
FIG. 2 is an exploded view of the present nest box.
Figure 3:
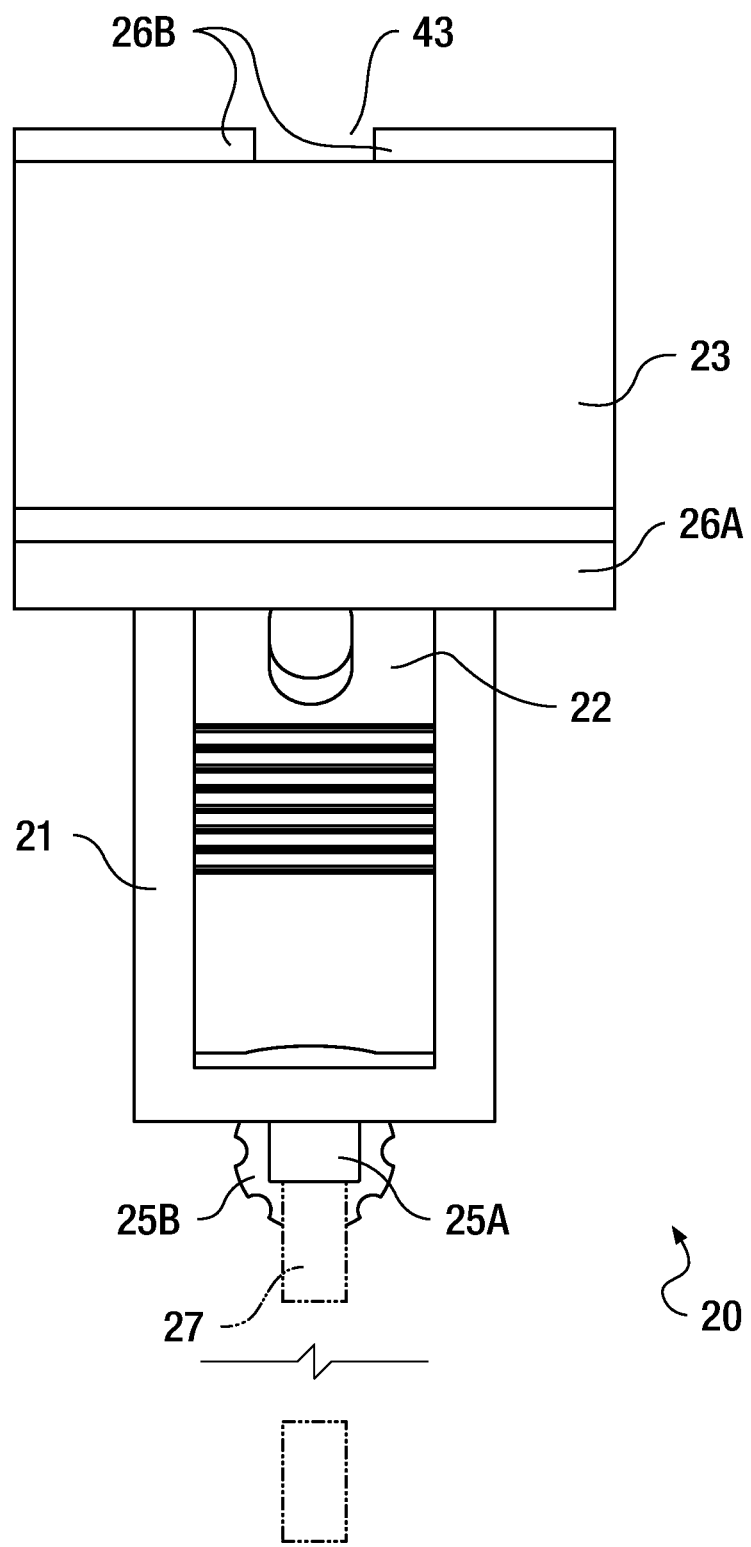
FIG. 3 is a front view of the present nest box.

Referring to FIG. 2, locking holes 32 receive a hollow ventilation locking pin 24 which secures the roof panel 23 via the protrusion hole 33 and, transitively, also secures the entrance panel 22 in place. The path of the hollow ventilation locking pin 24 is shown by dotted lines (P).

In an ideal embodiment, the main nest cavity enclosure 21 would be molded of plastic to help reduce ectoparasitic contamination and facilitate easy cleaning. However, it could be crafted from single or multiple pieces of any material that provides adequate durability and insulation value.

Figure 12:
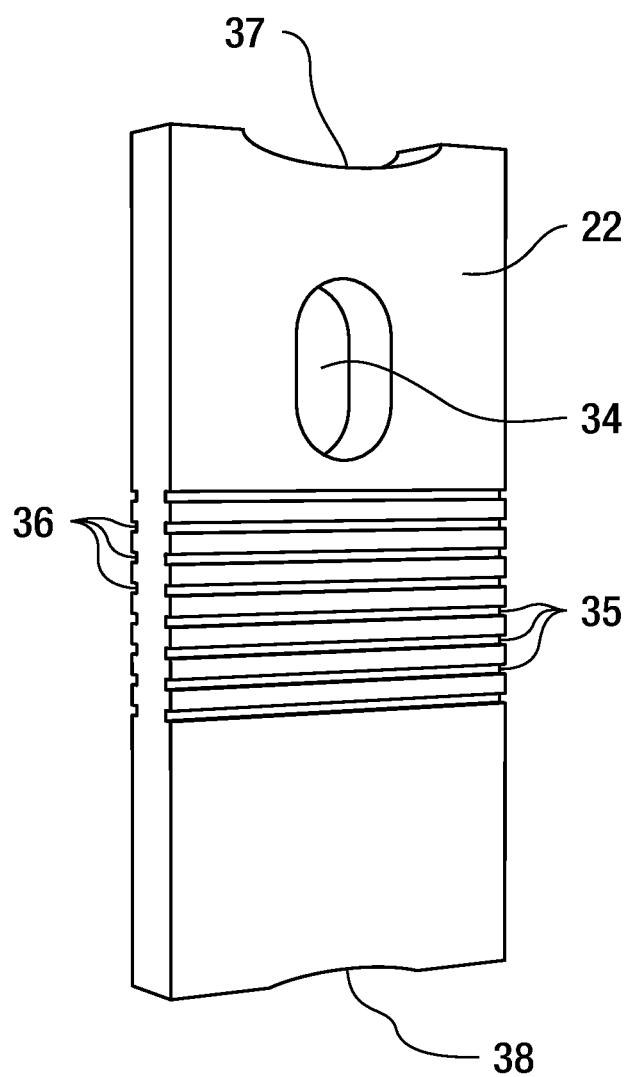
FIG. 12 is a front perspective view of the entrance panel.
Figure 13:
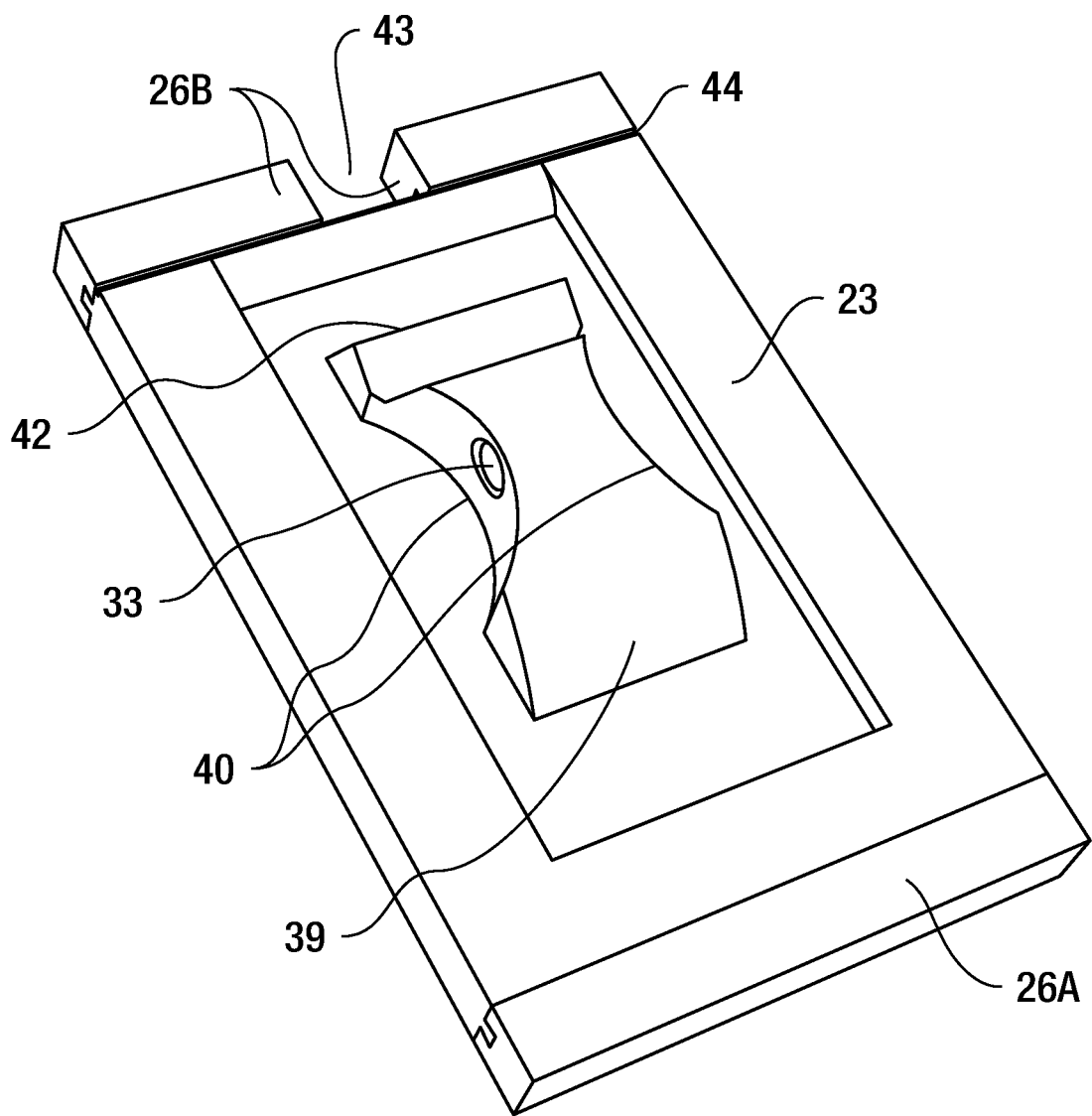
FIG. 13 is a bottom perspective view of the roof panel.
Figure 14:
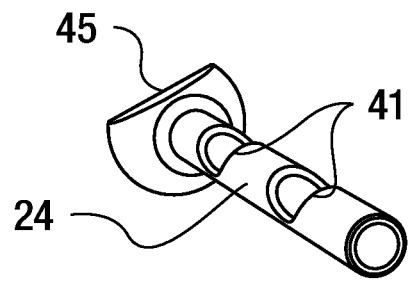
FIG. 14 is a left perspective view of the hollow ventilation locking pin.
Figure 15:
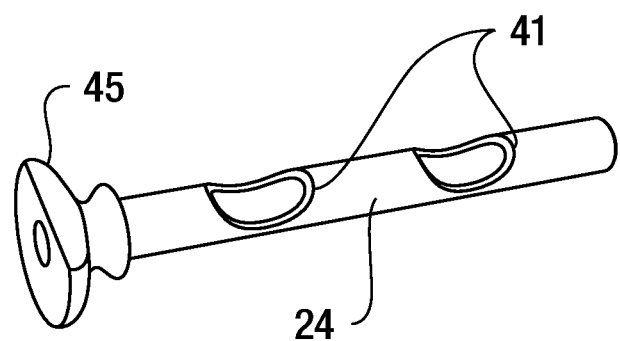
FIG. 15 is a top perspective view of the hollow ventilation locking pin.
Figure 16:
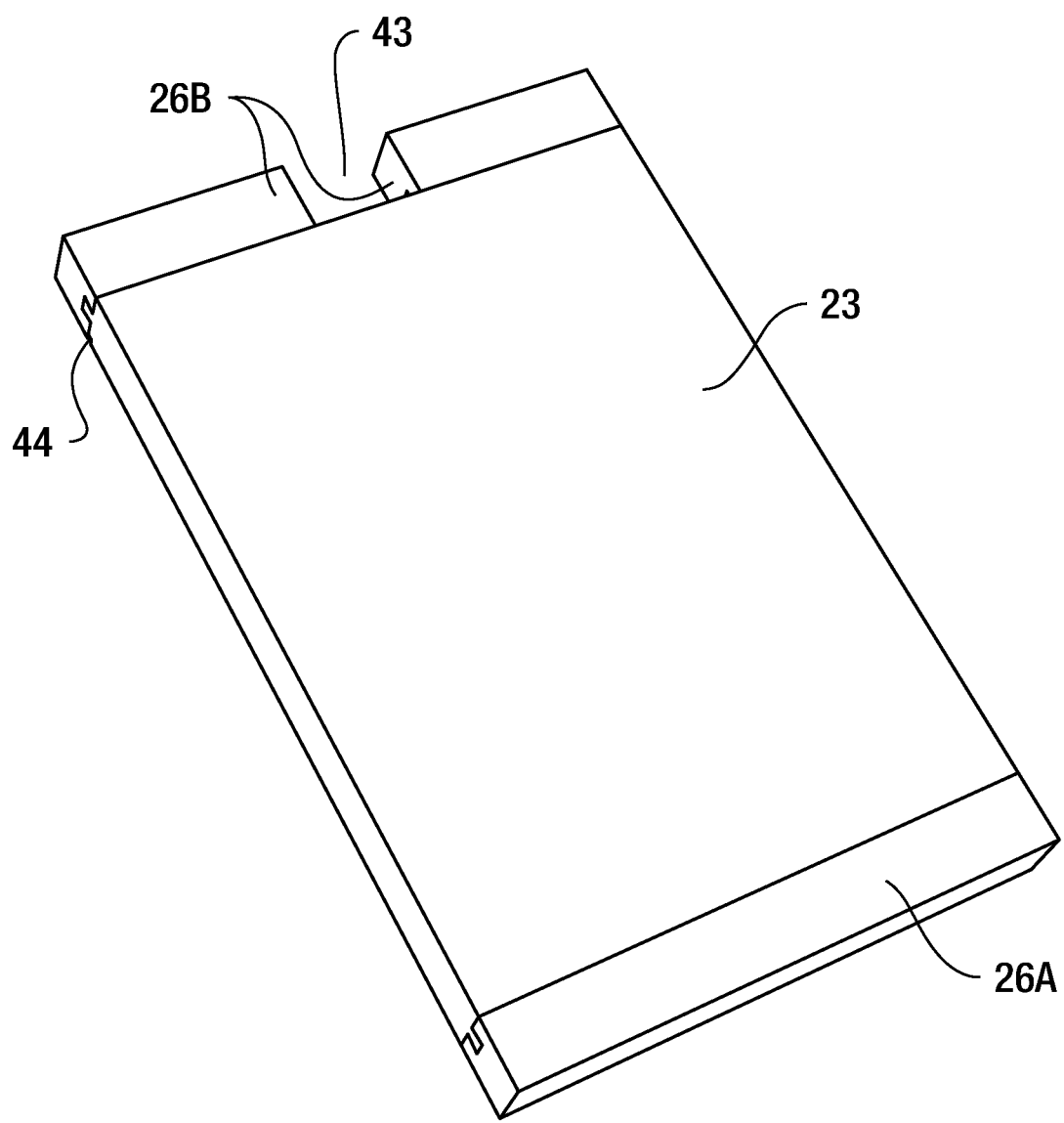
FIG. 16 is a top perspective view of the roof panel.

Referring to FIG. 12, the entrance panel 22 features an entryway 34, outer-ladder grooves 35 to assist adult-bird footing, inner-ladder grooves 36 to assist fledgling footing, a ventilation indentation 37, and a drainage indentation 38. Nest boxes can be adapted to different species by using entrance panels 22 with appropriately sized entryways 34. In an ideal embodiment, the entrance panel 22 would be manufactured of untreated, weather-resistant wood. However, it could be formed from any material which provides adequate durability, insulation value, and grip characteristics.

Referring to FIGS. 1, 2, 13-15, the roof panel 23 fits on top of the main nest cavity enclosure 21. The bottom of the roof panel 23 is recessed to fit over the main nest cavity enclosure 21 and seal against precipitation. Protrusion hole 33 in the roof protrusion 39 receives a hollow ventilation locking pin 24 via locking holes 32. This action secures the roof panel 23 to the main nest cavity enclosure 21 and, transitively, also secures the entrance panel 22 in place. Concave ventilation areas 40 of the roof protrusion 39 correspond with ventilation scallops 41 in the hollow ventilation locking pin 24 to increase airflow and cooling. Storage face 42 of the roof protrusion 39 helps to secure the entrance panel 22 during off-season storage.

Referring to FIGS. 3-8, 13, 16, the roof panel 23 overhangs the main nest cavity enclosure 21 on all sides to provide shade, promote cooling, and protect from precipitation. The roof cutout area 43 between rear roof edge trims 26B on the roof panel 23 allows the nest box to slide on steel pipe 27 without interference. In an ideal embodiment, the roof panel 23 would be molded of plastic with untreated, wooden, weather-resistant roof edge trim 26A, 26B. Many birds like to assume a sentry position on upper-roof edges and peek over lower-roof edges before entering a nest box. Roof edge trim 26A, 26B facilitates secure bird footing and may slide onto the roof panel 23 using dovetail joinery. Dovetail joinery allows easy replacement of roof edge trim 26A, 26B if necessary. A drip-edge groove 44 helps prevent precipitation from entering the main nest cavity enclosure 21. Similar to other nest box components, the roof panel 23 and roof edge trim 26A, 26B could be formed from any material which provides adequate durability, insulation value, and grip characteristics. Furthermore, roof panel 23 and roof edge trim 26A, 26B could be manufactured as one piece.

Referring to FIGS. 2, 5, 13-15, the hollow ventilation locking pin 24, as detailed previously, secures the roof panel 23 to the main nest cavity enclosure 21 and, transitively, also secures the entrance panel 22 in place. The hollow ventilation locking pin 24 can enter either locking hole 32 in the main nest cavity enclosure 21, proceed through protrusion hole 33 in the roof protrusion 39, and extend through the opposite locking hole 32 in the main nest cavity enclosure 21. The tube-like nature of the hollow ventilation locking pin 24, ventilation scallops 41 in the hollow ventilation locking pin 24, and corresponding concave ventilation areas 40 of the roof protrusion 39 increase airflow and cooling in the nest box cavity. Truncated face 45 on the knob of the hollow ventilation locking pin 24 orients the pin with its ventilation scallops 41 toward the roof panel 23. This orientation helps avoid snagging anything inside the nest box when the hollow ventilation locking pin 24 is removed or inserted. In an ideal embodiment, the hollow ventilation locking pin 24 would be molded from plastic; however, other durable materials capable of creating this shape could be used.

Figure 4:
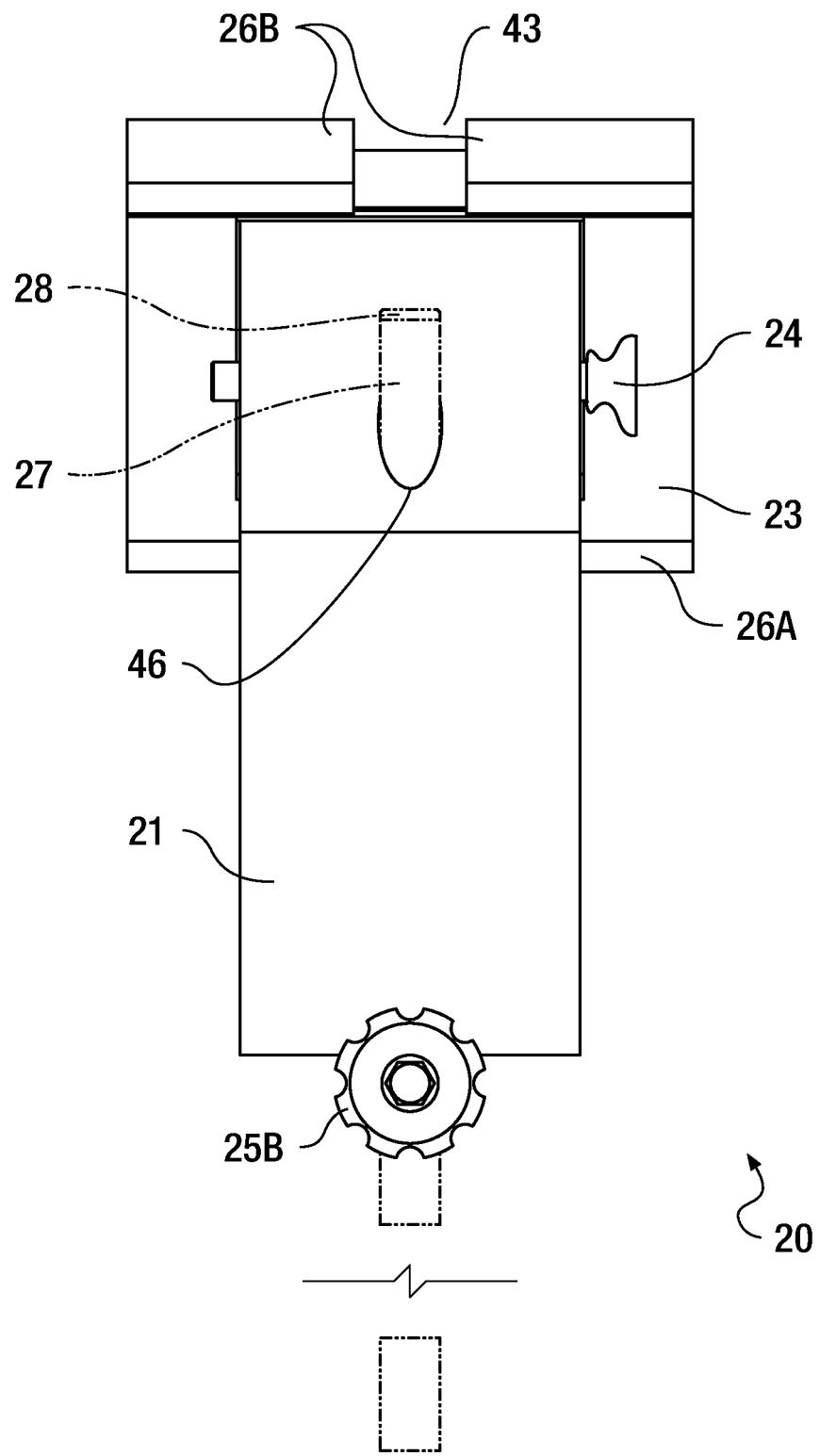
FIG. 4 is a rear view of the present nest box.
Figure 5:
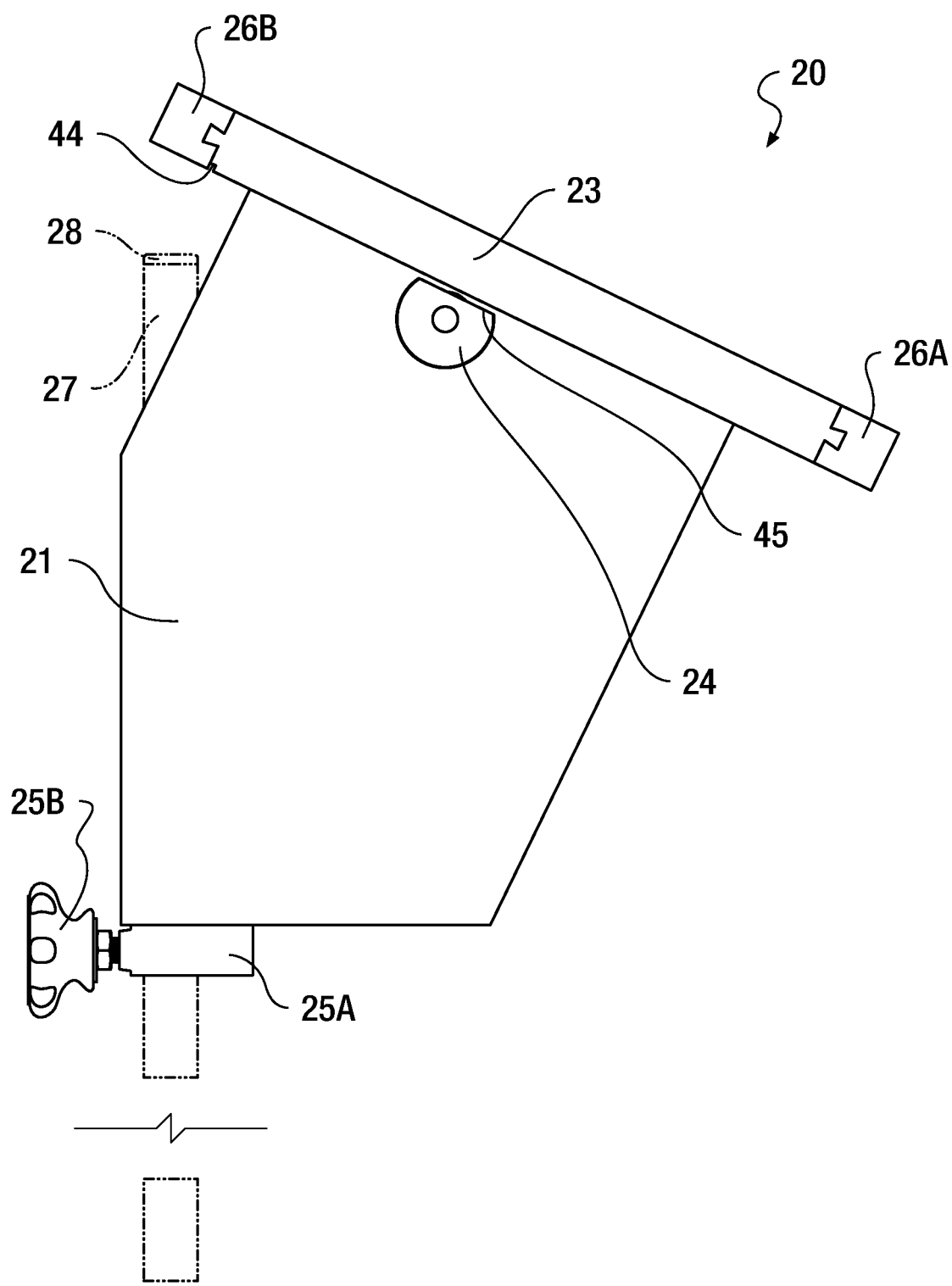
FIG. 5 is a right side view of the present nest box.
Figure 6:
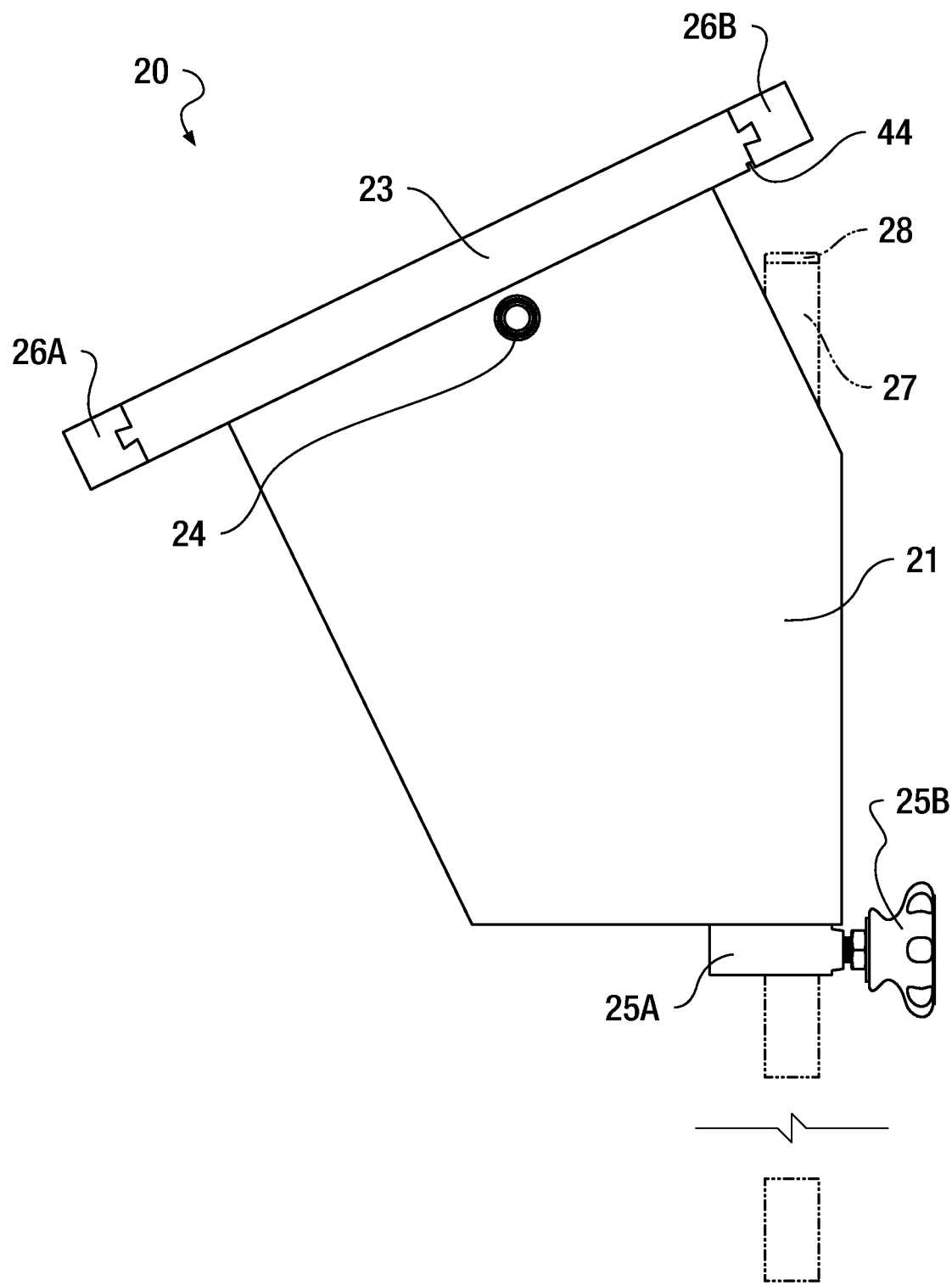
FIG. 6 is a left side view of the present nest box.
Figure 7:
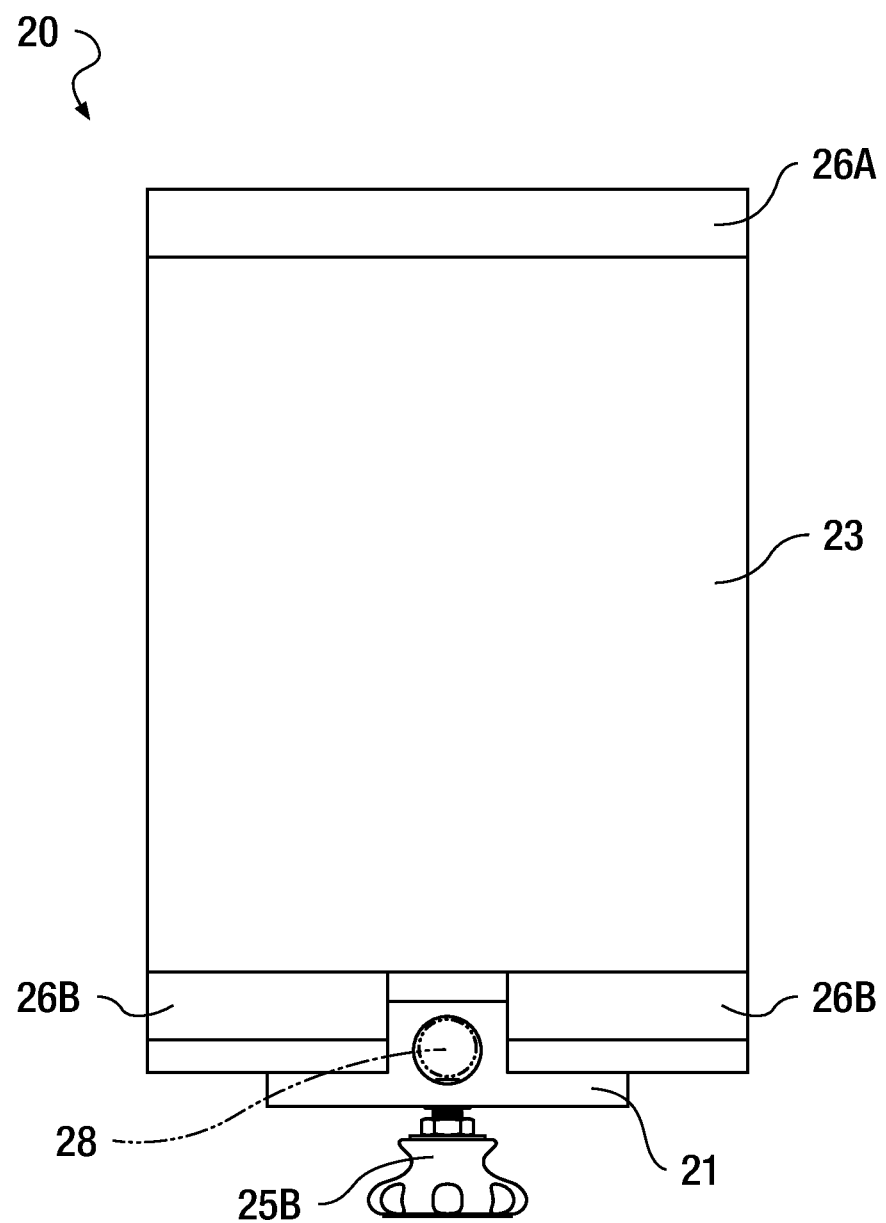
FIG. 7 is a top view of the present nest box.
Figure 8:
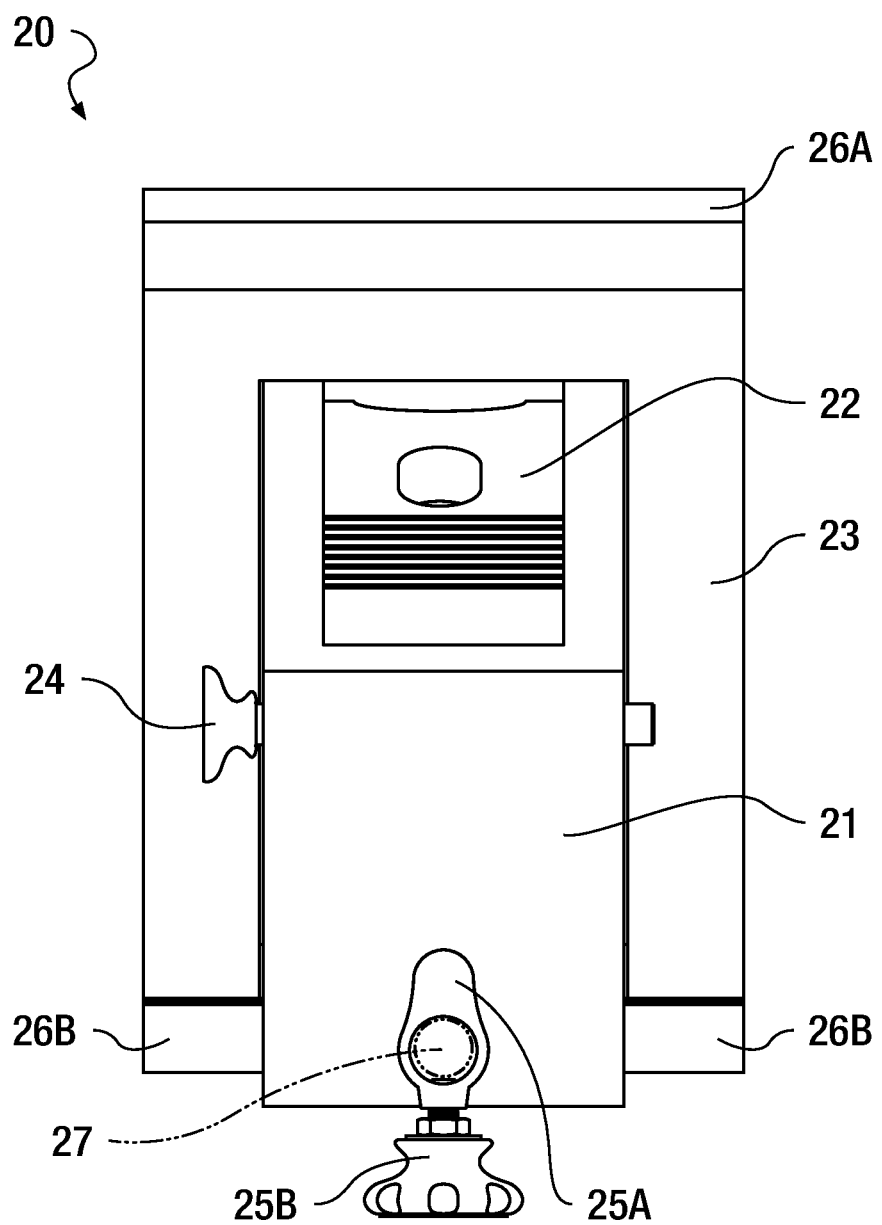
FIG. 8 is a bottom view of the present nest box.
Figure 17:
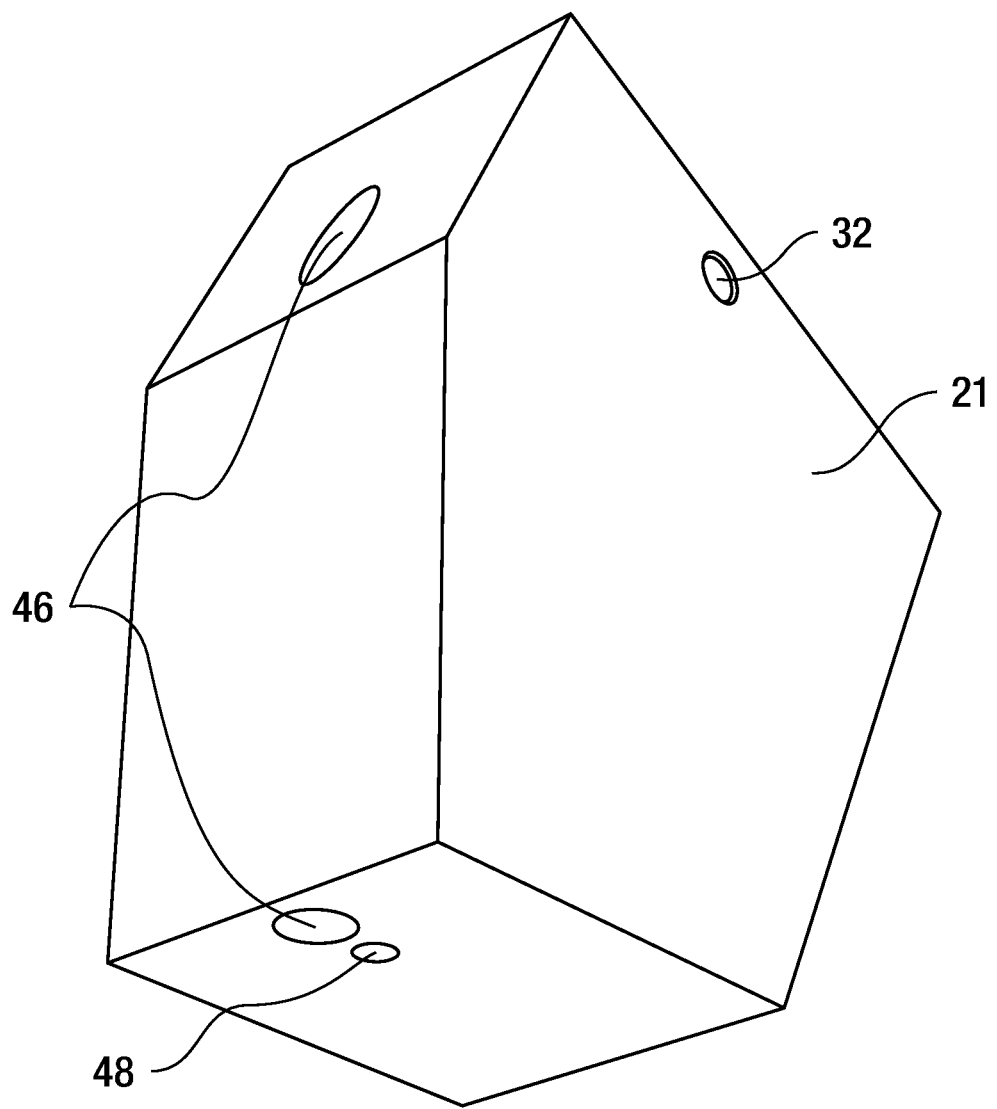
FIG. 17 is a bottom perspective view of the main nest cavity enclosure.
Figure 18:
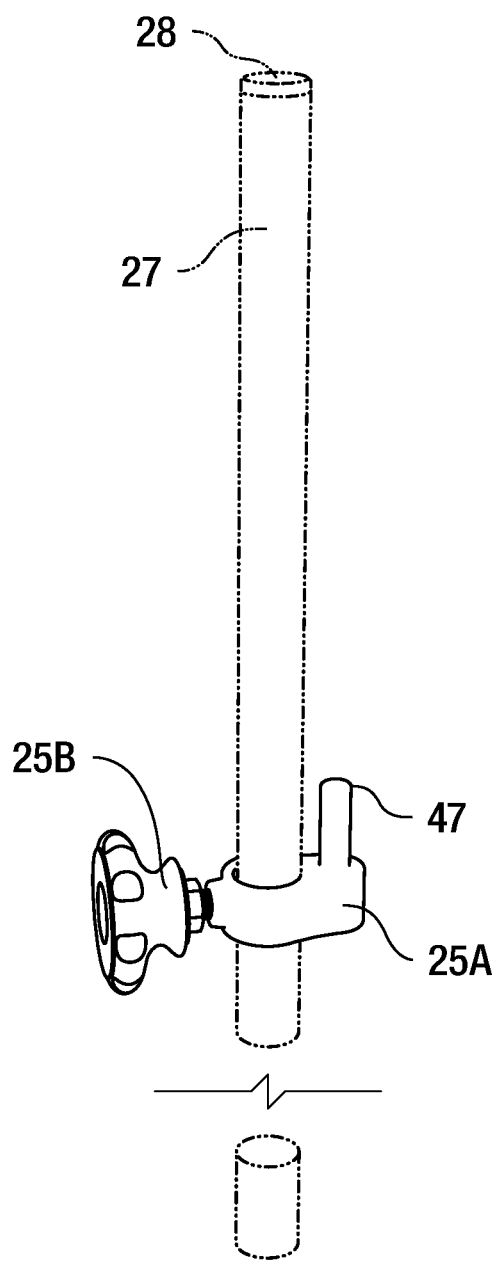
FIG. 18 is a right perspective view of the adjustable-height mounting mechanism positioned on a steel pipe.

Referring to FIGS. 4, 17-18, the main nest cavity enclosure 21 slides on readily available steel pipe 27 via mounting hole 46. Compared to commonly used mounts, like fence posts or trees, pipes are difficult for predators to climb and help prevent attacks. Steel pipe 27 should be anchored in the ground and of sufficient length to allow nest box positioning at recommended heights for attracting and protecting desired bird species. An optional pipe cap 28 may be inserted into the top end of steel pipe 27 to prevent water from entering and cracking steel pipe 27 during freezing conditions. An adjustable-height mounting mechanism 25A, 25B holds the nest box at the desired height on steel pipe 27. An alignment pin 47 mates with an alignment recess 48 in the bottom of the main nest cavity enclosure 21 to keep the structure oriented in a desired direction. Nest box height can be easily changed by loosening knob/setscrew component 25B, adjusting the height, and tightening knob/setscrew component 25B. (Knob/setscrew component 25B extends through support component 25A and squeezes steel pipe 27 when tightened.) The adjustable-height feature improves nest box monitoring and maintenance by allowing nest boxes to be temporarily lowered to safe heights—eliminating dangers such as ladder use. The exact embodiment of the adjustable-height mounting mechanism 25A, 25B could take many forms as long at it can be tightened securely without failing. The important aspects are that the adjustable-height mounting mechanism 25A, 25B is capable of holding the nest box securely on steel pipe 27; that the adjustable-height mounting mechanism 25A, 25B allow height adjustment for both an ideal nest box working height and a safe monitoring and maintenance height; and that the adjustable-height mounting mechanism 25A, 25B feature an alignment element to maintain nest box orientation and prevent a nest box from rotating around steel pipe 27.

While certain embodiments of the present nest box 20 have been described herein, the descriptions do not reflect all possible materials and/or executions of the invention. Adaptations within the broad scope of the description may be possible without departing from the spirit of the invention as established in the following claims.

The invention I claim is:

1. A nest box or birdhouse comprising:
    at least one wall and a floor partially enclosing a nest cavity for bird nesting;
    a removable roof panel, free from any attached vertical sidewall elements, plus a removable and interchangeable entrance panel, wherein an act of securing said roof panel to said at least one wall also secures said entrance panel in either of two positions—one position of the two positions completing an enclosure of said nest cavity with the other position eliminating any fully enclosed nest cavity; and
    a hollow ventilation pin which secures said removable roof panel to said at least one wall and permits airflow through said hollow ventilation locking pin into the nest cavity.

2. The nest box or birdhouse of claim 1, further including an adjustable-height mounting mechanism capable of securely holding said nest box at various heights on a pipe and preventing said nest box from rotating on said pipe, thereby maintaining directional orientation of said nest box.

3. A nest box or birdhouse comprising:
    at least one wall and a floor partially enclosing a nest cavity for bird nesting;
    a removable roof panel, free from any attached vertical sidewall elements, plus a removable and interchangeable entrance panel, wherein an act of securing said roof panel to said at least one wall also secures said entrance panel in either of two positions—one position of the two positions completing an enclosure of said nest cavity with the other position eliminating any fully enclosed nest cavity;
    a hollow ventilation locking pin which secures said removable roof panel to said at least one wall and permits airflow through said hollow ventilation locking pin into the nest cavity;
    an adjustable-height mounting mechanism capable of securely holding said nest box at various heights on a pipe and preventing said nest box from rotating on said pipe, thereby maintaining directional orientation of said nest box.

* * * * *